United States Patent [19]

Green et al.

[11] Patent Number: 4,641,207
[45] Date of Patent: Feb. 3, 1987

[54] DIAGNOSTIC DEVICE AND METHOD FOR EXAMINING THE OPERATION OF A DISK DRIVE

[76] Inventors: George D. Green; Lauren M. Laboe, both of 4801 Guilford Rd., College Park, Md. 20740; Richard Cook, 413 W. Side Dr., Gaithersburg, Md. 20878

[21] Appl. No.: 477,707

[22] Filed: Mar. 22, 1983

[51] Int. Cl.⁴ .................. G11B 5/02; G06F 11/00; G06F 11/22; G06F 3/02
[52] U.S. Cl. ........................... 360/55; 360/31; 371/21; 364/200
[58] Field of Search ............ 360/31, 55, 98, 53; 364/900, 200 MS File; 371/21

[56] References Cited

U.S. PATENT DOCUMENTS

| | | | |
|---|---|---|---|
| 3,755,790 | 8/1973 | Berger | 364/900 |
| 4,103,338 | 7/1978 | Cizmic et al. | 364/900 |
| 4,214,280 | 7/1980 | Halfhill | 360/53 |
| 4,268,905 | 5/1981 | Johann et al. | 364/200 |
| 4,333,177 | 6/1982 | Sutterlin | 371/15 |
| 4,348,761 | 9/1982 | Berger | 371/21 |

OTHER PUBLICATIONS

Programmable Loop Back Read Diagnostic for Disk Drive, T. H. Miller et al, IBM Technical Disclosure, vol. 14, No. 8, 1/1972, Leibson; Handbook of Microcomputer Interfacing ©1983, pp. 39-45.

Primary Examiner—Raymond F. Cardillo
Assistant Examiner—Alyssa H. Bowler
Attorney, Agent, or Firm—Birch, Stewart, Kolasch and Birch

[57] ABSTRACT

An external diagnostic device for examining the operation of a disk drive. The device is coupled to input terminals and output terminals of the drive and operates in a selected one of several modes at a given time. In a passive mode, the drive terminals are connected to a host computer and the device monitors the presence of signals at the terminals. In a manual mode, the host computer is disconnected from the drive and the device simulates the host computer, directing control signals to the drive via appropriate input terminals. In a test mode, signals from sensors or the head in the drive are directed to the device via corresponding output terminals. Sensor and head signals are processed to determine operational parameters of the drive—such as speed, azimuth and radial alignment, sector burst, and proper reading and writing of data. Before entering the manual mode or the test mode, a step to track 00 operation is performed and a determination is made as to whether the head has been sensed at track 00. When in the passive mode, control signals from the devices are inhibited. When in the test mode, simulated control signals from the device are provided as required, the host computer and the drive being disconnected also during the test mode.

36 Claims, 5 Drawing Figures

DIAGNOSTIC DEVICE AND METHOD FOR EXAMINING THE OPERATION OF A DISK DRIVE

FIELD OF THE INVENTION

The present invention relates to a diagnostic device for examining the operation of disk drive, the diagnostic device being external to the drive.

TECHNOLOGICAL CONTEXT OF THE INVENTION

In a computer system employing disk storage, a host computer enters into communication with a disk by means of a disk drive. The drive is equipped with a head for transferring magnetically storable data to and from the disk. To effect data transfer at the correct location on the disk, the drive includes means for (a) radially moving the head in steps from one circular track to another and/or (b) angularly moving the disk relative to the head from one wedge-shaped sector to another. Because the data transferred depends on the relative positioning of the head as determined by the drive, it is evident that proper data transfer and proper drive operation are inextricably connected.

The prior technology has, accordingly, recognized the importance of assuring the proper operation of the disk drive and has suggested techniques directed to achieving this end. One technique has included the use of an internal microprocessor in the drive itself. According to this technique, an externally provided command is directed to the internal microprocessor via a bussing network. In response to the command, the internal microprocessor performs a test sequence that checks various characteristics of the drive. This technique, of course, relies on the "intelligence" of the drive itself and is therefore not particularly adaptable to a drive which is not programmed or programmable to perform test routines.

In addition, as disk drive technology has progressed—by, for example, replacing the voice coil with a more precise stepper motor to achieve relative motion between the head and disk—the need for intelligence in the drive has greatly diminished and, hence, many current drives are not equipped for internal data processing. Such prior technology is thus limited in application and somewhat dedicated in its usefulness.

Other techniques have concentrated on testing the internal circuitry of the drive, but have not been directed to mechanical and electromechanical problems which may arise in the drive.

In addition, a review of prior and contemporaneous technology indicates that existing diagnostic devices do not permit examination of drive operation when the drive is in communication with the host computer and, alternatively, when the drive and the host computer are not connected—the drive instead being in communication with an external device that provides signals to and receives from the drive as does the host computer. Current technology thus does not provide an in-line device which either passively monitors the drive or actively directs simulated signals to the drive while receiving signals therefrom.

SUMMARY OF THE INVENTION

The present invention examines the operation of a disk drive by a device external thereto. Significantly, the device is operable in any of several selectable modes in order to examine the drive under different conditions.

In a passive mode, the device is connected to receive signals directed to and from the drive on corresponding communication lines extending between a host computer and the drive. In the passive mode, the device in effect monitors the passing of signals along the various communication lines and separately indicates each communication line carrying a signal. The operator detects a problem by noting which line is identified as not carrying a signal when it should be.

In addition to the passive mode, the present device includes a manual mode. In accordance with the manual mode the host computer and the drive are not interconnected and the device acts to simulate the host computer by directing similar control signals to the drive along appropriate input lines to the drive.

Yet a third mode involves the processing of signals received by the device from the drive when the host computer and the drive are not connected. In this "test" mode, operational parameters of the drive—such as speed, azimuth alignment of the head, radial alignment of the head, sector burst interval, and proper writing and reading—are performed by receiving and processing signals generated by the drive.

By employing the three selectable modes, the present invention not only evaluates the disk drive operation more thoroughly, but also helps isolate the location of problems. For example, if the drive does not respond to a control signal from the host computer (in the passive mode), but does respond to a similar control signal from the device (in the manual mode), a problem with the signal from the host computer is suggested. Similarly, if there is no response to a control signal from the host computer (in the passive mode) and no response to a control signal from the device (in the manual mode), the problem would appear to be in the drive.

It is also an object of the present invention to achieve correct relative track positioning of the head prior to operation in the manual or test modes. That is, the head is automatically stepped to a reference track (such as track 00) and a reference track sensor signal from the drive is checked before the device will assume either the manual mode or the test mode. In addition to assuring that subsequent procedures are properly referenced, this feature also provides a reference track, e.g. track 00, test.

In order to maintain the device in a true passive mode and to assure that the drive is subject to only one controller at a time, the device includes means for disabling control signal outputs therefrom when in the passive mode.

Further, to achieve the object of usefulness in examining any of variety of drives, the present invention provides means for varying the input/output connections between the device and the drive. Specifically, the device has a plurality of connector points in a predefined order which normally corresponds to the order of input and output terminals at the drive. However, where the order of connector points on the device differs from the order of corresponding terminals on the drive, a patch board arrangement is provided to effect proper interconnection between the connector points on the device and the terminals on the drive.

The present invention also realizes the object of convenience—especially in field applications—by being portable, by being readily adaptable to various drives regardless of terminal (or pin) order, and by evaluating unintelligent drives by using signals the drive is adapted to normally accept and generate.

In addition, the device is initialized to select one of several drives for testing and to select various drive characteristics—such as drive size, tracks per inch, and total tracks. The initialization adds to the flexibility of the device.

BRIEF DESCRIPTION OF THE DRAWINGS

FIG. I is a diagram showing the present invention in an intended environment.

FIG. II is a diagram illustrating the hardware components of an embodiment of the present invention.

Figure 1:
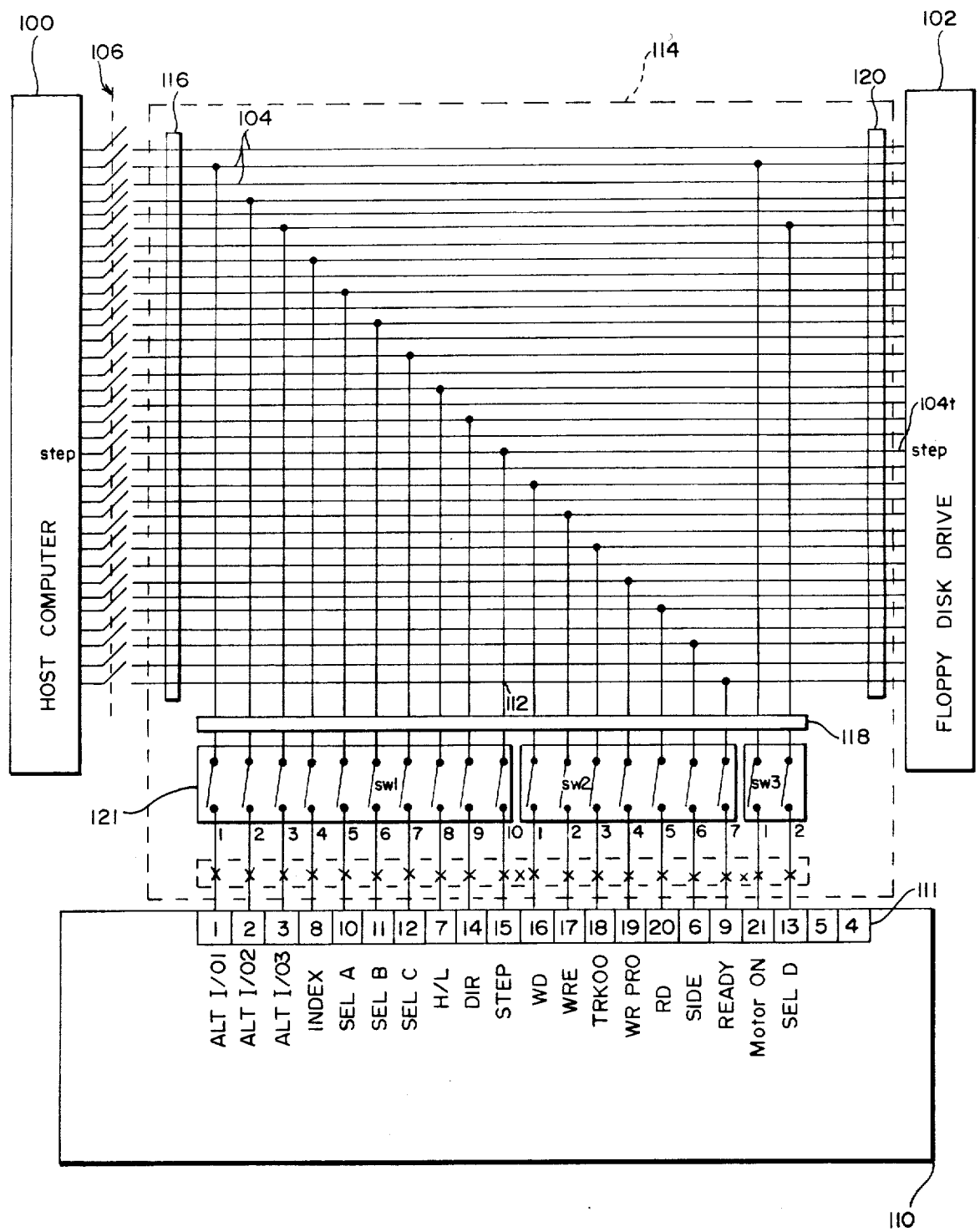
Figure 2:
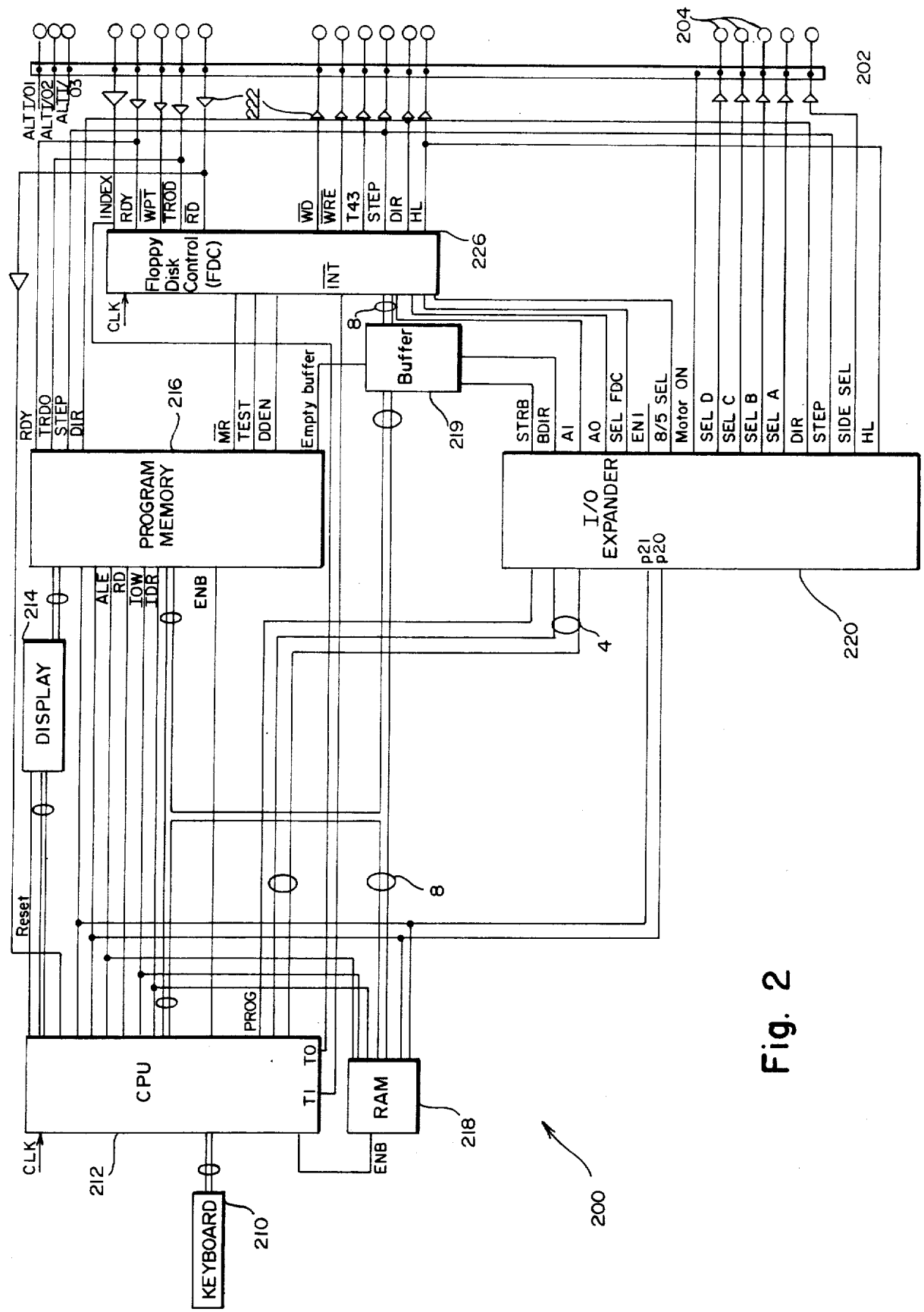
Figure 3A:
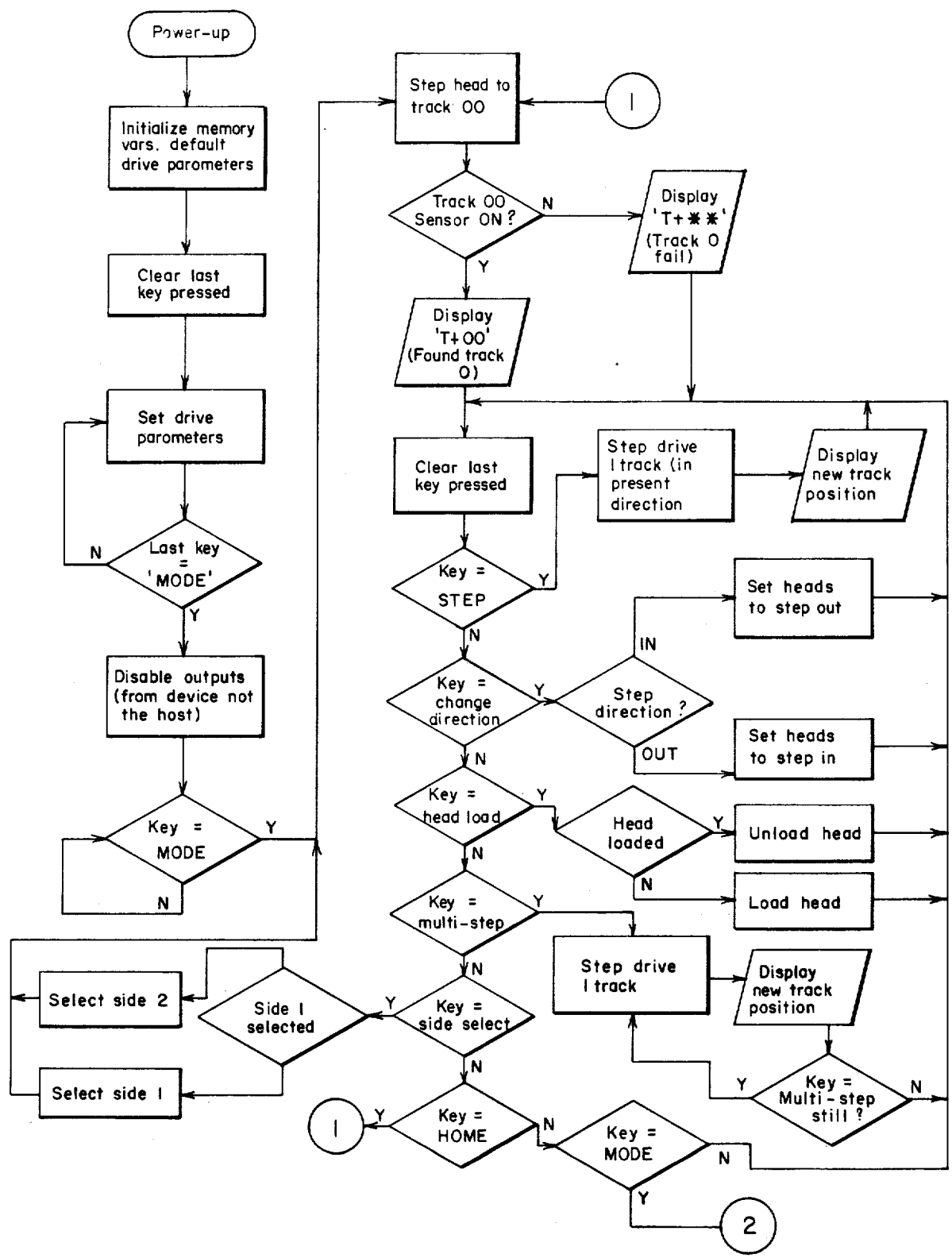
Figure 3B:
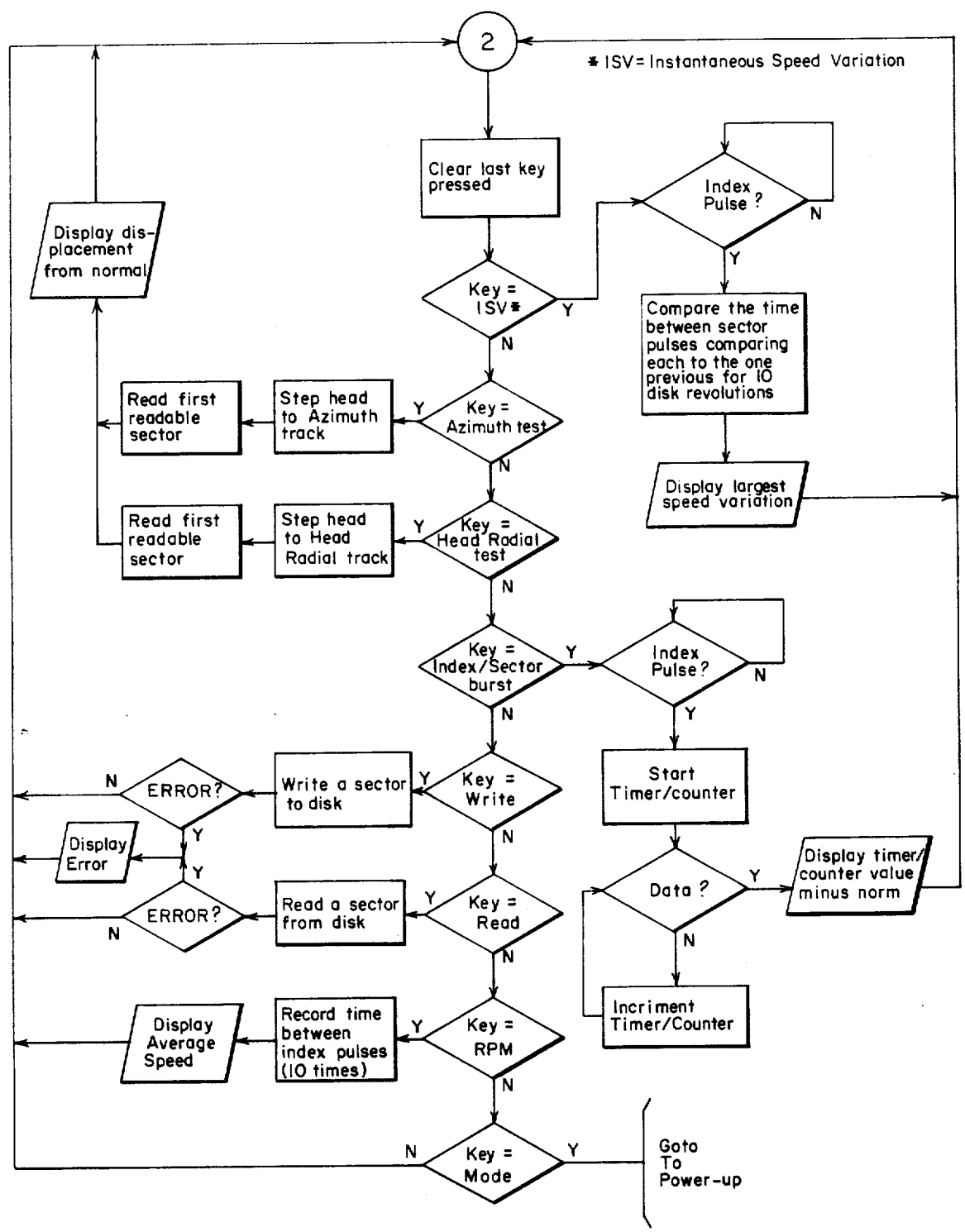
Figure 4:
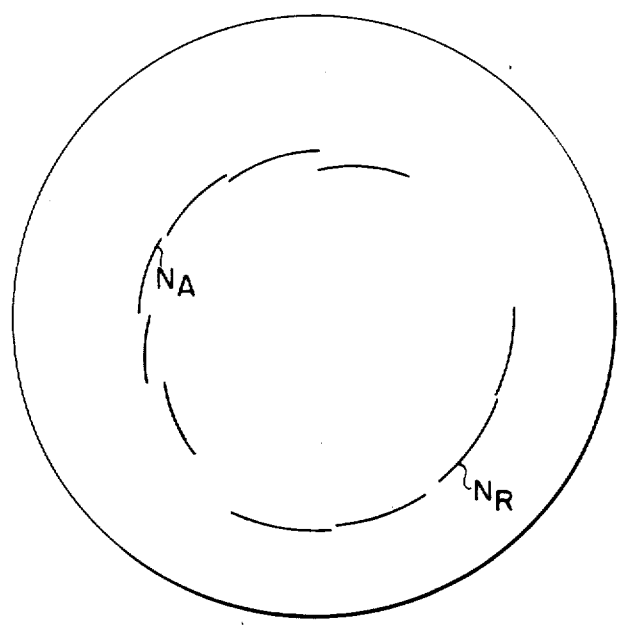

FIGS. III(A) and III(B) is a flowchart which implements the hardware of FIG. II.

FIG. IV is an illustration of a test disk employed in determining azimuth alignment and radial alignment.

DESCRIPTION OF THE INVENTION

Referring to FIG. I, a host computer 100 and a floppy disk drive 102 are shown connectable by communication lines 104. A ganged switch 106 selectively closes and opens the communication lines 104. When the switch 106 is closed, the host computer 100 is able to send control signals, write signals, and other transmitted signals to the drive 102 over corresponding communication lines 104 as directed. In the reverse direction, signals from the drive 102 are also free to pass to the host computer 100 over corresponding communication lines 104 as directed. When the switch 106 is closed, the host computer 100 and drive 102 are in normal communication. Contrarily, when the switch 106 is open, the host computer 100 neither sends signals to nor receives signals from the drive 102.

Also shown in FIG. I is a diagnostic device 110 according to the invention. The device 110 is shown having a plurality of connector points extending from 1 to 21 in a prescribed order along a connector 111, each having an identifying label. Each of some of the connector points 1 to 21 corresponds to a given, customary input or output from a typical disk drive. For example, terminal 15 corresponds to a simulated STEP command control signal. Looking at communication line 104t, it is noted that the terminal connected thereto at the host computer 100 and the terminal connected thereto at the drive 102 are also labelled STEP.

When the switch 106 is closed, the host computer 100 can direct a STEP command control signal to the drive 102 (via the terminal marked "STEP" and a stepper motor (not shown) in the drive 102 steps the drive head (not shown) radially. A similar effect results by directing a simulated STEP control signal to the "STEP" terminal of the drive 102 via the device terminal 15 and a lead line 112 connected to line 104t.

The order of the connector points 1 to 21 preferably corresponds to the order of the terminals, or pins, at the drive 102. In that way, a simple T connector 114 with three junction connectors 116, 118, and 120 may be employed. If the terminals on the drive 102 (and hence the host computer 100) are not in the same order as the connector points 1 to 21—e.g. the STEP terminal on the drive 102 is not on line 104t—the connections at junction connector 116 are varied to achieve proper terminal correspondence. Accordingly, connector 116 is preferably a patch board so that each lead line 112 can be selectively connected to a corresponding terminal 1 to 21. Specifically independent switches 120 are shown, each having a first contact extending from a corresponding connector point 1 to 21 and a second contact in electrical contact with one of the drive terminals. (The contacts, it is noted, are readily substitutable by leads, pins, terminals, or the like so long as there are two for each switch that are connected to each other upon switch closing). To connect a connector point coupled to the first contact of a first switch to a drive terminal associated with the second contact of a second switch, the first and second switch are opened and a jumper lead (not shown) is patched between the first contact of the first switch and the second contact of the second switch. In that way, each connector point 1 to 21 can be connected to any corresponding lead line 112 enroute to a desired input or output terminal on the drive 102.

Also provided are switches 120 which permit the selective disconnection of terminals 1 to 21 from lead lines 112.

Referring now to FIG. II, a device 200 similar to device 110 of FIG. I is shown. As in FIG. I, the device 200 should be viewed as if connected to a host computer and a disk drive by a connector such as 114. Along the right side of the drawing is a connector 202 with connector points thereon. (A review of the labels in FIG. II shows similarity with those in FIG. I. By employing a patch board junction 116, there is some latitude in the ordering of the terminals along the connector 202). Coupled to each terminal along the connector 202 is an indicator lamp 204. When a signal passes through a corresponding terminal, the respective lamp 204 illuminates. In this regard, it is noted that with the host computer and the disk drive connected (see the switch 106 shown in FIG. I), signals from both the host computer and from the drive enter corresponding connector points on the connector 202 to illuminate appropriate lamps 204.

Turning now to the hardware of the device 200 of FIG. II, a keyboard 210 is shown coupled to a CPU 212. The keyboard 210 is adapted from a conventional keyboard, with one of the keys being designated a MODE key and the other keys corresponding to control signals or tests that the operator can select. The CPU 212 may be an Intel 8748 or any of various other commercially available microprocessors. The CPU 212 is driven by a conventional crystal clock CLK.

Connected to the CPU 212 is a display 214 which is informed by the CPU 212 of the type of information the display 214 is displaying. Data to the display 214, which is preferably a commercially available DL2416, is received from port 215 of program memory I/O element 216. The program memory element 216 is preferably an Intel 8755. The display 214 is reset by a signal from the CPU 212 along a RESET line.

The program memory element 216 and the CPU 212 communicate over a plurality of lines. Eight data lines, it is noted, extend between the CPU 212 and the memory element 216 and also directed to both a random access memory (RAM) 218 and a buffer 219. The RAM 218 is preferably an Intel 8185-2 while the buffer 219 preferably comprises a WD1510-00. The Address Latch Enable (ALE), Input/output write (IOW), and Input/Output read (IOR) lines between the CPU 212 and program memory element 216 are also fed into three corresponding terminals of the RAM 218. The RAM 218 and the program memory element 216 and the buffer element 219 are each enabled by the CPU 212 along a respective ENB line.

Also connected to the CPU 212 by four (n) lines is an I/O expander 220, for example an Intel 8243, which converts a coded input on the four lines from the CPU 212 into sixteen ($2^n$) distinct outputs. Some of the selectable outputs from the I/O expander 220, are connected to respective pins on the connector 202. (The amplifiers 222, it is noted, suggest the direction of signal flow). These outputs include: a head load (HL) line, a side select (SIDE SEL) line, a STEP line, a step direction (DIR) line, drive select lines (SELA, SELB, SELC, SELD), and MOTOR ON line.

In addition to the outputs which are connected to the connector 202, the I/O expander 220 also directs outputs therefrom to a floppy disk control (FDC) 226, such as a WD2797B-02. One input to the FDC 226 is an 8/5 SIZE signal which informs the FDC 226 of the size of the disk in the disk drive (not shown). A second input is labelled SEL FDC and permits the CPU 212 to actuate the FDC 226. Two additional lines A0, A1 also extend from the I/O expander 220 to the FDC 226, signals thereon select which register in the FDC 226 is to be either written into or read from. BDIR corresponds to a signal indicating the direction of data travel through the buffer 219.

The buffer 219 provides temporary storage for data carried in either direction over eight lines between the CPU 212 and the FDC 226. The direction of data flow is determined by the signal BDIR. The buffer 219 includes two independent ports, one connected to the CPU 212 and the other connected to the FDC 226. Data is strobed into or from the CPU port of the buffer 219 by write or read commands, respectively, from the CPU 212. Data is strobed into or from the FDC port of the buffer 219 by either a STRB input from the I/O expander 220 or a data request from the FDC 226 over line DRQ.

Examining the FDC 226 further, it is noted that a number of identifiable signals can enter therein and exit therefrom at terminals along the connector 202.

The lower six lines—namely WD, WRE, T43, STEP, DIR, and HL—relate to simulated control signals that can be directed to the drive (such as drive 102 of FIG. I). WD represents a write data command; WRE represents a write enable command; T43 represents command ordering the head to track 43; STEP represents a command directing the head to increment radially inward or outward depending on how the command DIR has toggled the stepping direction; and HL represents a command directing the head to approach the disk in the drive.

The upper five lines—namely INDEX, RDY, WPT, TR00, and RD—relate to signals received from the drive. In understanding the INDEX line, it is noted that disks are provided with one or more distinctive elements thereon which are detected at least one per revolution by an INDEX sensor of the drive. The INDEX line detects the pulses from the INDEX sensor. Also, the distinctive element—which is generally a hole detected optically—serves as a reference position relative to predefined data, a sector header, included on the disk. The INDEX line is also provided as an input to the CPU 212 at a pin T0. The RDY line simply represents the ready signal from the drive. The WPT line represents write protect, indicating whether the disk can or cannot be written on. The TR00 line represents that a track zero sensor has detected the head at track 00. The RD line represents read data. (Bars over a label in the drawing indicating that signals are inverted. The bars are omitted for convenience in this description).

Data from the FDC 226 enters the buffer 219 along the eight lines shown and thereafter is disseminated to the CPU 212, the program memory element 216, and the RAM 218 over the eight lines shown in FIG. II.

The MR (Master Reset) line, the TEST line, and the DDEN (Double DENsity) lines between the program memory element 216 and the FDC 226 all provide respective inputs to the FDC 226. The INT line represents an interrupt signal to the CPU 212 from the FDC 226.

With reference again to the program memory element 216, RDY and TR00 signals from the drive and STEP signals from the I/O expander 220 or FDC enter the element 216.

Also, RD signals received from the drive are also channelled to the CPU 212.

Power inputs, clocking, and other portions of the hardware are within the skill of the art and are not detailed.

In operation, the hardware in FIG. II is implemented by a procedure set forth in the flow charts of FIGS. III(A) and III(B) which form the basis of the programming of the CPU 212. Specifically, after power is switched on, an initialization step is performed followed by a clearing of the host key actuation on the keyboard 210 (or FIG. II). Drive parameters—such as drive size, tracks per inch, and number of tracks—are set during initialization.

Upon pressing the MODE key, the device 200 enters a passive mode. Signals entering the terminals of the connector 202 from the host computer and the drive (see FIG. I) cause the lamps (or LEDs) 204 to illuminate. To prevent the device 200 from directing signals to the drive while the host computer is also directing signals to the drive, the CPU 212 disables the outputs from the device 200.

A second pressing of the MODE key results in an automatic "step-to-track zero" routine. Specifically, the head is commanded to continue stepping until (a) the drive signals the device on line TR00 that track 00 has been reached or (b) the number of commanded steps exceeds the total number of disk tracks. The result is displayed on display 214 as "T+00" if track 00 is reached or "T+**" if there is a failure.

Thereafter, any of various keys on the keyboard 210 may be pressed to effectuate a particular control signal to the drive. The device 200 is now in a manual mode in which various drive functions can be selectively ordered. A first key effects a "step", a new track position of the head then being displayed. A second key effects a direction change in stepping. A third key results in a head load (HL) command. A fourth key permits successive stepping by keeping the key pressed, the current track position being displayed on display 214. A fifth key determines which side of the drive (or disk) is to be selected. A sixth key returns the device 200 to the "step-to-track zero" routine when actuated.

If the MODE key is pressed a third time after power-up, the device 200 enters a test mode in which the CPU 212 calls for analysis or processing of signals received from the drive. For example, a "speed variation" key or an "RPM" key can be pressed, in which case the time between INDEX pulses is used to determine a parameter relating to speed variation over a single revolution or an RPM parameter. Two other keys relate to head alignment in the azimuth and radial directions, respectively.

To effectuate these alignment tests, a special disk as shown in FIG. IV is employed. Along one "track" prescribed data is repeated from one sector to another with the data being radially offset inwardly and outwardly from a desired normal position depending on which sector is read first by the head and how far the data in the sector is from the normal, a radial alignment error is determined. Regarding azimuth, successive strings of data are again repeated from one sector to the next. However, for azimuth, the successive strings are skewed to various positions relative to the normal. In either test, the first readable sector indicates the displacement which is then displayed on display 214.

Pressing a write key and a read key determines if there is an error in these operations. The writing and reading error checks are performed by the FDC 226 based on inputs received from the drive. The types of checks and manner of checking is disclosed by the manufacturer, Western Digital, in its published specifications of the floppy drive controller (the WD279X) preferably used in the invention. For example, the FDC 226 performs a cyclical redundancy code check from the inputs to the FDC 226. The reading check may be performed by reading data preprogrammed on a test disk and determining if the data as read correlates with the data as preprogrammed on the test disk.

Yet another key relates to INDEX/SECTOR BURST which measures the time between an index pulse and the first reading of data at a sector header. If the header is improperly positioned, the spacing and timing differs from a norm. The error defined as the actual time minus the norm is displayed.

Pressing the MODE key a fourth time returns the device 200 to the power-up step.

To reduce keyboard size, it should be realized that the same keys may be used in the manual mode and in the test mode to effectuate different operations.

In addition, the number of terminals at the connector 202 may be expanded as desired. Moreover, the ALT I/0 1, 2, and 3 terminals shown in FIG. II may be connected to add inputs or outputs as desired.

Other improvements, modifications and embodiments will become apparent to one of ordinary skill in the art upon review of this disclosure. Such improvements, modifications and embodiments are considered to be within the scope of this invention as defined by the following claims. For example, although directed preferably to a floppy disk drive, the invention applies to other disk drives as well. Also, the switch 106 (of FIG. I) may be omitted, disconnection between the host computer 100 and the drive being effected by unplugging the host computer 100 from a junction connecting it to the communication lines 104.

I claim:

1. In a system including (a) a disk drive having a plurality of input terminals and output terminals and (b) a host computer adapted to be connected to the input terminals and the output terminals, an external device for examining the operation of the disk drive and the communication between said host computer and said disk drive, the device comprising:
   a plurality of connector points;
   means for selectively coupling each connector point to any one of a plurality of input terminals or output terminals of a disk drive when the order of a connector points on the device differs from the order of corresponding terminals on the drive;
   switching means for selectively connecting the input and output terminals of said disk drive and said host computer;
   first means for sensing signals at each of at least some of the input terminals and output terminals, said first means monitoring the communication between said disk drive and said host computer, when said disk drive and said host computer are interconnected by said switching means, to detect a deviation from standard disk drive responses;
   second means for providing signals from the device to the input terminals of the drive, the drive responding to each provided signal at a corresponding input terminal as if a signal from the host computer were received at the same input terminal; and
   mode select means for selectively inhibiting the enabling of the second means when the host computer is connected to provide signals to and receive signals from at least some of said terminals.

2. A device as in claim 1 wherein said switching means disconnects the host computer from the drive when the second means is enabled.

3. A device as in claim 2 further comprising:
   third means for processing signals entering connector points from corresponding output terminals to automatically determine operational parameters of the drive.

4. A device as in claim 3 wherein the third means comprises:
   fourth means for providing signals from the device to the input terminals of the drive, the drive responding to each provided signal at a corresponding input terminal as if a signal from the host computer were received at the same input terminal;
   at least a number of the signals processed by the third means being generated by the drive in response to the providing of signals thereto.

5. A device as in claim 4 wherein the mode select means further comprises:
   means for selectively enabling the third means and inhibiting the second means; and
   wherein said switching means disconnects the host computer from the drive when the third means is enabled.

6. A device as in claim 5 wherein the mode select means further comprises:
   means for selectively enabling either the first means, the second means, or the third means at any given time.

7. A device as in claim 6 wherein at least one of the signals from the second means and from the fourth means corresponds to drive control signals.

8. A device as in claim 7 wherein a signal on a first input terminal causes a head on the disk drive to step radially from one track on a disk to an adjacent track; and
   wherein the drive has a track sensor which directs a signal to a first output terminal when the head is at a predefined reference track; and
   wherein the device further comprises:
   actuatable means for automatically sending a succession of signals to the first input terminal;
   means for detecting when the first output terminal receives a signal, the first output terminal being coupled to a respective connector point; and
   means for selectively actuating the actuatable means prior to the enabling of the second means or the third means.

9. A device as in claim 3 wherein a signal on a first input terminal causes a head on the disk drive to step radially from one track on a disk to an adjacent track; and wherein the drive has a track sensor which directs a signal to a first output terminal when the head is at a predefined reference track; and wherein the device further comprises:

actuatable means for automatically sending a succession of signals to the first input terminal;

means for detecting when the first output terminal receives a signal, the first output terminal being coupled to a respective connector point; and means for selectively actuating the actuatable means prior to the enabling of the second means or the third means.

10. A device as in claim 9 further comprising:

memory means for storing the maximum number of tracks the drive can step for a particular disk therein;

means for counting the number of signals automatically sent to the first terminal after the actuatable means is actuated; and means for detecting an error when (a) the number of counted signals equals the stored maximum number of tracks and (b) the detecting means has not indicated the receipt of a signal at the first output terminal.

11. A device as in claim 10 wherein the means for coupling connector points to corresponding terminals comprises:

patch board means for selectively linking each connector point to any corresponding terminal of the drive.

12. A device as in claim 1 wherein the means for coupling connector points to corresponding terminals comprises:

patch board means for selectively linking each connector point to any corresponding terminal of the drive.

13. A device as in claim 1 wherein at least some of the signals from the second means correspond to drive control signals.

14. A device as in claim 13 wherein the drive has a second input terminal, successive signals thereto effectuating a loading and unloading of the head in alternation; and wherein the second means, when enabled, is coupled to the drive to selectively send a corresponding control signal to the second input terminal.

15. A device as in claim 13 wherein the drive has a third input terminal, successive signals thereto effectuating a change in stepping direction; and wherein the second means, when enabled, is coupled to the drive to selectively send a corresponding control signal to the third input terminal.

16. A device as in claim 13 wherein the drive has a first input terminal, each successive signal at which effectuates a stepping of the head; and wherein the second means, when enabled, is coupled to the drive to selectively send a corresponding control signal to the first input terminal.

17. A device as in claim 1 wherein the drive has a fourth input terminal, a signal thereto effectuating a write enable input; and wherein the second means, when enabled, is coupled to the drive to selectively send a signal to the fourth input terminal.

18. A device as in claim 17 wherein the drive has a fifth input terminal, a signal thereto effectuating a write data input; and wherein the second means, when enabled, is coupled to the drive to selectively send a signal to the fifth input terminal.

19. A device external to a disk drive for examining the operation thereof and the communication between said disk drive and a host computer, the device having a plurality of connector points coupled to input terminals and output terminals of the drive, signals to some of the output terminals corresponding to signals provided by sensors or a head of the drive, the head being adapted to read data, the device comprising:

first means for monitoring the communication between said disk drive and said host computer to detect a deviation from standard disk drive responses;

second means for selecting one a plurality of operational parameters of the drive to be determined;

mode select means for selectively inhibiting said second means when said host computer is connected to provide signals to and receive signals from said disk drive;

a test disk, formatted into a plurality of angularly spaced sectors, each sector having a string of data bits thereon, at least one string having a normal alignment and at least one string being displaced relative to the normal; and microprocessor-controlled means for processing signals entering connector points from appropriate output terminals of said some output terminals to determine the selected operational parameters of the drive wherein the microprocessor-controlled means includes;

means for detecting the sector at which a string of bits is readable by the head, and means for determining the displacement, if any, of the head from normal alignment based on the detected sensor, wherein said test disk is utilized in said disk drive only when said means for determining displacement is implemented.

20. A device as in claim 19 wherein one of the sensors generates an index pulse for each revolution of a disk in the drive; and wherein successive index pulses pass from one of the output terminals to a corresponding first connector point; and wherein the microprocessor-controlled means includes:

means for determining drive speed operational parameters from successive index pulses passed to said first connector point.

21. A device as in claim 19 wherein the microprocessor-controlled means further includes:

means for writing data onto a sector on a disk; and means for determining if the data written onto the disk is correct.

22. A device as in claim 19 wherein the microprocessor-controlled means further includes:

means for reading data from a sector on a disk; and means for determining if the data read from the disk is correct.

23. A device external to a disk drive for examining the operation thereof and the communication between said disk drive and a host computer, the device having a plurality of connector points coupled to input terminals and output terminals of the drive, signals to some of the output terminals corresponding to signals provided by sensors or a head of the drive, the device comprising:

first means for monitoring the communication between said disk drive and said host computer to detect a deviation from standard disk drive responses;

second means for selecting one of a plurality of operational parameters of the drive to be determined;

mode select means for selectively inhibiting said second means when said host computer is connected to provide signals to and receive signals from said disk drive; and microprocessor-controlled means for processing signals entering connector points from appropriate output terminals of said some output terminals to determine the selected operational parameters of the drive wherein the drive provides an index pulse at the same time during each revolution of a disk as an index point on the disk passes a sensor in the drive; and wherein successive pulses pass from one of the output terminals to a corresponding first connector point; and wherein index sector data burst readable by the head is normally spaced at a normal angular distance from the index point; and wherein the drive provides a signal at one of the output terminals to a corresponding second connector point when the data burst is read; and wherein the microprocessor-controlled means further includes:

means for determining the time between an index pulse and the reading of the data burst from signals at the first connector point and the second connector point.

24. A device external to a disk drive that is connected to a host computer for examining the operation thereof and the communication between said disk drive and the host computer, the device having a plurality of connector points coupled to input terminals and output terminals corresponding to signals provided by sensors or a head of the drive, the device comprising:

first means for monitoring the communication between said disk drive and said host computer to detect a deviation from standard disk drive responses;

second means for selecting one of a plurality of operational parameters of the drive to be determined;

mode select means for selectively inhibiting said second means when said host computer is connected to provide signals to and receive signals from said disk drive; and display means for selectively indicating at least some of operational parameters when determined; and microprocessor-controlled means for processing signals entering connector points from appropriate output terminals of said some output terminals to determine the selected operational parameters of the drive for reading data from a sector on a disk and for determining if the data read from the disk is correct, the microprocessor-controlled means being coupled to the display means and providing input to the display means identifying the operational parameters and the determined value thereof.

25. A method of examining a selectable one of a plurality of disk drives and communications between said one of said disk drives and a host computer with an external, microprocessor-controlled diagnostic device, the method comprising the steps of:

selecting one of the disk drives;

selectively connecting (a) input terminals and output terminals of the selected drive with (b) said host computer which provides a respective signal to each input terminal and receives a respective signal from each output terminal;

coupling the diagnostic device to the terminals of the disk drive;

limiting the diagnostic device to only receiving signals directed to and exiting from the terminals of the disk drive when a connection is provided between the terminals and the host computer;

selectively directing signals from the diagnostic device respective input terminals, the signal to each input terminal effectuating an input to the drive;

inhibiting the selective directing of signals when a connection is provided between the terminals and the host computer and selectively entering the device into one of a number of operating modes including the alternative steps of, (a) entering the device into a passive mode which includes the steps of:

providing connection between the host computer and the disk drive along a pluraliity of communication lines which carry input signals to and output signals from the drive, and monitoring the presence of signals on each of at least some of the communication lines to determine deviations from standard disk responses; and (b) entering the device into a manual mode which includes the steps of;

providing disconnection between the host computer and the drive, and directing control signals to the drive from the device, each such device being received by the drive as if it were a corresponding input signal from the host computer.

26. A method as in claim 25 wherein the drive has a head and the method comprises the further step of:

stepping the head of the disk drive to a track 00 on a disk in the drive and determining if the head is sensed at track 00 prior to the selective directing of signals.

27. A method as in claim 25 wherein the drive has a plurality of sensors therein and wherein the method comprises the further steps of:

receiving signals at the device from the sensors through respective output terminals of the drive; and processing received signals to determine operational parameters of the drive.

28. A method as in claim 27 wherein the processing step comprises the steps of:

selecting one operational parameter for evaluation;

defining the received signals appropriate for determining the selected operation; and processing the received signals defined to be appropriate.

29. A method as in claim 28 wherein the signal receiving step, the received signal processing step, and the parameter selecting step are performed only after the head has been stepped to track 00.

30. A method as in claim 29 wherein the drive size, the total number of tracks, and the number of tracks per inch are selectable characteristics; and wherein the method comprises the further step of:
setting the selectable characteristics to selected states prior to any other step.

31. In a system having a host computer, a disk drive, and a diagnostic device connectable to the disk drive, a method of examining the operation of the drive and communications between said disk drive and said host computer comprising the steps of:
selectively entering the device into one of a number of operating modes including the alternative steps of:
(a) entering the device into a passive mode which includes the steps of:
providing connection between the host computer and the disk drive along a plurality of communication lines which carry input signals to and output signals from the drive; and
monitoring the presence of signals on each of at least some of the communication lines to determine deviations from standard disk drive responses; and
(b) entering the device into a manual mode which includes the steps of:
providing disconnection between the host computer and the drive; and
directing control signals to the drive from the device, each such signal from the device being received by the drive as if it were a corresponding input signal from the host computer.

32. A method as in claim 31 wherein selective entering of the device includes the further alternative step of:
(c) entering the device into a test mode which includes the steps of:
providing disconnection between the host computer and the drive;
selecting one of a number of operational parameters, each operational parameter being determinable from specific signals in the drive; and
receiving said specific signals at the device from the drive for said each operational parameter.

33. A method as in claim 32 wherein the entering of the device into the test mode further includes the step of:
processing the specific received signals for said each operational parameter to determine said each operational parameter.

34. A method as in claim 33 wherein the step of selectively entering the device into the passive mode, the manual mode, or the test mode includes the step of:
pressing a prescribed key on a keyboard of the device, the number of presses corresponding to the mode selected.

35. A method as in claim 34 comprising the further step of:
varying the signal output for each of a plurality of data keys on the keyboard depending on the number of prior presses of the prescribed key, the data keys thereby providing different effects depending on whether the device is in the passive mode, the manual mode, or the test mode.

36. A method as in claim 35 comprising the further step of:
disabling signal outputs from all data keys and enabling signal output from only the prescribed key when the device is in the passive mode.

* * * * *